(12) United States Patent
Wang et al.

(10) Patent No.: US 7,627,406 B2
(45) Date of Patent: Dec. 1, 2009

(54) SYSTEM AND METHOD FOR DATA STORAGE AND DIAGNOSTICS IN A PORTABLE COMMUNICATIONS DEVICE INTERFACED WITH A TELEMATICS UNIT

(75) Inventors: Mingheng Wang, Rochester Hills, MI (US); Steven J. Ross, Livonia, MI (US); Edward P. Chrumka, Grosse Pointe Park, MI (US)

(73) Assignee: General Motors Corporation, Detroit, MI (US)

( * ) Notice: Subject to any disclaimer, the term of this patent is extended or adjusted under 35 U.S.C. 154(b) by 331 days.

(21) Appl. No.: 11/036,525

(22) Filed: Jan. 13, 2005

(65) Prior Publication Data

US 2006/0155437 A1    Jul. 13, 2006

(51) Int. Cl.
*G01M 17/00* (2006.01)
(52) U.S. Cl. .............. 701/33; 340/879.07; 340/539.24
(58) Field of Classification Search .......... 340/870.07, 340/539.24; 701/33
See application file for complete search history.

(56) References Cited

U.S. PATENT DOCUMENTS

| | | | | |
|---|---|---|---|---|
| 5,442,553 | A * | 8/1995 | Parrillo | 455/420 |
| 6,330,499 | B1 * | 12/2001 | Chou et al. | 701/33 |
| 6,535,112 | B1 * | 3/2003 | Rothschink | 340/425.5 |
| 6,748,211 | B1 * | 6/2004 | Isaac et al. | 455/414.1 |
| 6,956,501 | B2 * | 10/2005 | Kitson | 340/870.07 |
| 2004/0204069 | A1 * | 10/2004 | Cui et al. | 455/557 |
| 2005/0203683 | A1 * | 9/2005 | Olsen et al. | 701/35 |
| 2005/0283285 | A1 * | 12/2005 | Ying | 701/29 |
| 2006/0106508 | A1 * | 5/2006 | Liebl et al. | 701/29 |

FOREIGN PATENT DOCUMENTS

WO    PCT/US04/2241    7/2004

OTHER PUBLICATIONS

Kelly Carroll, Data to ride shotgun: InfoMove helps connect cars to Internet, Telephony Dec. 13, 1999, Copyright 1999 by Primedia Business Magazines & Media Inc., "All Rights Reserved", Telephony, Spectrum; ISSN: 0040-2656, 1091 words.

Seattle, InfoMove Delivers New Generation of Wireless Internet Services for the Car, Business Wire, Oct. 18, 1999, Copyright 1999 Business Wire, Inc. Business Wire, Business Editors/Technology Writers, 994 words.

Bob Low, Motoring in the new millennium on the Net, Daily Record, May 1, 1998, Copyright 1998 Scottish Daily Record & Sunday Mail Ltd., Daily Record May 1, 1998, Friday, p. 31 Road, 734 words.

(Continued)

*Primary Examiner*—Mark Hellner

(57) ABSTRACT

A method of performing vehicle diagnostics including receiving diagnostic information from at least one electronic module of a vehicle at a portable communication device from a telematics unit via a short-range wireless connection, storing the received diagnostic information in a memory in the portable communication device to form a recent-history vehicle database, performing a diagnostic analysis based on the recent-history vehicle database and sending the received diagnostic information from the portable communication device to an external memory to form an historic vehicle database.

21 Claims, 5 Drawing Sheets

OTHER PUBLICATIONS

Tarre Beach, New Products; Sidebar, Wireless Review Apr. 1, 2000, Copyright 2000 by Primedia Business Magazines & Media Inc., "All rights Reserved" Wireless Review, Apr. 1, 2000, New Products; ISSN: 1099-9248, 351 words.

Flint, Mich., Jan. 3, BUIC XP2000—A Concept Cat For The 21$^{st}$ Century, PR Newswire, Jan. 3, 1995, Copyright 1995 PR Newswire Association, Inc. PR Newswire, Jan. 3, 1995, Tuesday, Finanacial News, (With Photo) To Business and Auto Editors, 2149 words.

* cited by examiner

SYSTEM AND METHOD FOR DATA STORAGE AND DIAGNOSTICS IN A PORTABLE COMMUNICATIONS DEVICE INTERFACED WITH A TELEMATICS UNIT

FIELD OF THE INVENTION

This invention relates generally to storing data in a portable communication device and performing diagnostics on that data. In particular, the invention relates to storing data received from a telematics unit in a recent-history database in a portable communication device and storing data received from a telematics unit in an historic vehicle database in an external memory.

BACKGROUND OF THE INVENTION

The opportunity to personalize features in a mobile vehicle is ever increasing as the automobile is being transformed into a communications and entertainment platform as well as a transportation platform. Many new cars will be installed with some type of telematics unit to provide wireless communication and location-based services. These services may be accessed through interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

For example, traffic and driving directions may be accessed through a voice portal that uses incoming number identification to generate location information based on the area code or prefix of the phone number, or to access location information stored in a user's profile associated with the phone number. Users may be prompted to enter more details through a voice interface. Other examples are web and wireless portals that offer location-based services such as maps and driving directions where the user enters both a start and end addresses. Some of these services may have a voice interface.

Some users want to receive and process diagnostic information about their vehicle at a portable communication device in the vehicle, to supplement and enhance the standard vehicle checkup at a vehicle service center. In addition some users want to be warned if there is a vehicle problem or a potential problem. Additionally, some users want a reminder to perform some service for the vehicle, such as an oil change. In order to provide that information to a user, at least a database with recent vehicle status information must be stored in an accessible memory. The memory in the telematics unit is often full with other critical vehicle information and does not have the sufficient memory allocated for all the recent vehicle status information.

Some users want to have access to a complete vehicle database that contains regularly updated input from the electronic modules of a vehicle. Such a complete database is useful for trouble-shooting a vehicle problem in the event that a vehicle problem develops over time. Storing a complete vehicle history of all vehicles in the telematics system can overwhelm the databases of a call center.

Currently, research is underway to provide integrated Vehicle Electronics systems, typically known as Vetronics, for military vehicles. The umbrella of Vetronics integrates intelligent systems, robotic mobility, system architecture and telematics in the most advanced military ground vehicle systems. Vetronics will be able to supply the soldiers with the data fusion required for high levels of situational awareness on a hostile battlefield. Vehicles with embedded Vetronics log data and send it to remote data centers.

It is desirable, therefore, to offer the user a short-range wireless connection with the telematics unit in the vehicle so that the telematics unit can send diagnostic information to the portable communication device. It is further desirable for the portable communication device to perform diagnostic analysis on the diagnostic information. It is further desirable to send the diagnostic information and the diagnostic analysis to an external database for storage.

SUMMARY OF THE INVENTION

One aspect of the present invention provides a method of performing vehicle diagnostics, the method includes receiving diagnostic information from at least one electronic module of a vehicle at a portable communication device from a telematics unit via a short-range wireless connection, storing the received diagnostic information in a memory in the portable communication device to form a recent-history vehicle database, performing a diagnostic analysis based on the recent-history vehicle database and sending the received diagnostic information from the portable communication device to an external memory to form an historic vehicle database.

Another aspect of the present invention provides a system for performing vehicle diagnostics. The system includes means for receiving diagnostic information from at least one electronic module of a vehicle at a portable communication device from a telematics unit via a short-range wireless connection, means for storing the received diagnostic information in a memory in the portable communication device to form a recent-history vehicle database, means for performing a diagnostic analysis based on the recent-history vehicle database and means for sending the received diagnostic information from the portable communication device to an external memory to form an historic vehicle database.

A third aspect of the present invention provides computer readable medium storing a computer program including computer readable code operable for receiving diagnostic information from at least one electronic module of a vehicle at a portable communication device from a telematics unit via a short-range wireless connection, for storing the received diagnostic information in a memory in the portable communication device to form a recent-history vehicle database, for performing a diagnostic analysis based on the recent-history vehicle database and for sending the received diagnostic information from the portable communication device to an external memory to form an historic vehicle database.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
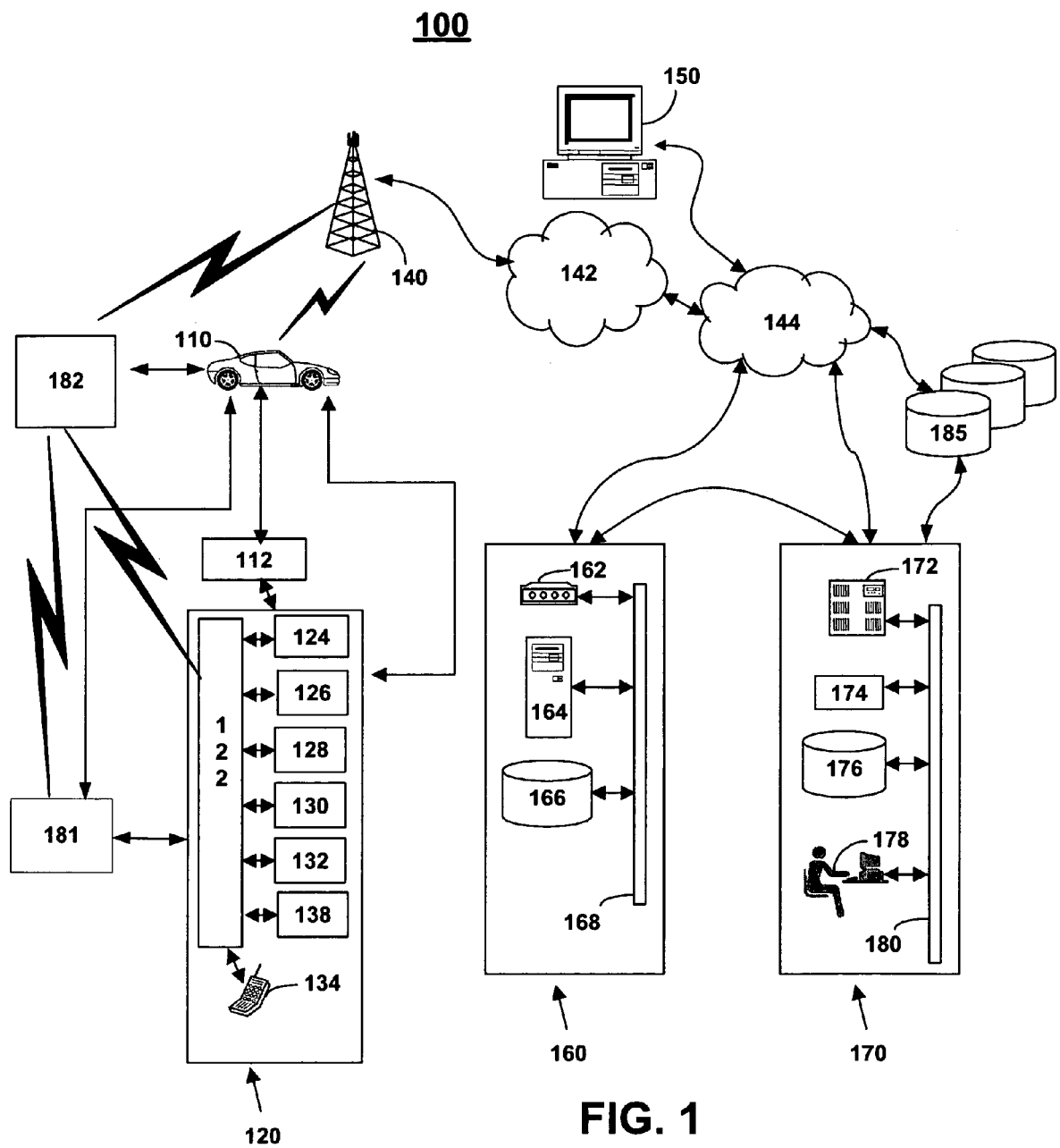
FIG. 1 is a schematic diagram of a system for providing access to a telematics system in a mobile vehicle.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, one or more call centers 170, and one or more data centers 185. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 includes electronic modules 135, 136 and 137 (FIGS. 2 and 3) attached to the vehicle communication network 112. Some electronic modules include the engine control module, transmission control module, steering control module, body control module, doors control module, Powertrain Control Module (PCM), Antilock Brakes System (ABS) control modules, and Instrument Panel Cluster (IPC). MVCU 110 may include additional components not relevant to the present discussion.

Vehicle communication network 112 sends signals between various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, an embedded or in-vehicle mobile phone 134, and a short-range wireless device 138. In other embodiments, telematics unit 120 may be implemented without one or more of the above listed components, such as, for example, for example an in-vehicle mobile phone 134 or speakers 132. Telematics unit 120 may include additional components not relevant to the present discussion.

Processor 122 is implemented as a microcontroller, microprocessor, controller, host processor, or vehicle communications processor. In one embodiment, processor 122 is a digital signal processor (DSP). In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone, such as, for example an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g. call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from processor 122 are translated into voice messages and sent out through speaker 132.

The short-range wireless device 138 implements a short-range wireless technology within the telematics unit 120. The short-range wireless device 138 can be a Bluetooth chip, a Wi-Fi chip, a FCC part 15 device or a radio chip, all of which provide a bridge between the telematics unit 120 and a portable communication device 182, such as a PDA or a laptop computer operating within the MVCU 110. In one embodiment, a short-range wireless chip 139 shown in FIG. 3, such as a Bluetooth chip, a Wi-Fi chip, or a radio chip, provides a bridge between a vehicle interface system 181 and a portable communication device 182. The vehicle interface system 181 has a hardwire connection with the telematics unit 120. In one embodiment, the short-range wireless device 138 is internal to the processor 122.

The portable communication device 182 is in communication with the telematics unit 120 via the short-range wireless device 138. In one embodiment, the portable communication device 182 is in communication with vehicle interface system 181 via a short-range wireless chip in the vehicle interface system 181. The portable communication device 182 is also in communication with the one or more wireless carrier systems 140, one or more communication networks 142, one or more land networks 144, one or more client, personal or user computers 150, one or more web-hosting portals 160, one or more call centers 170, and one or more data centers 185.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160 and one or more data centers 185. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions. Communication services database 176 sends data transmissions to or receives data transmissions from one or more data centers 185 through wireless carrier system 140, communication network 142, land network 144, voice and data switch 172, and network system 180.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

Figure 2:
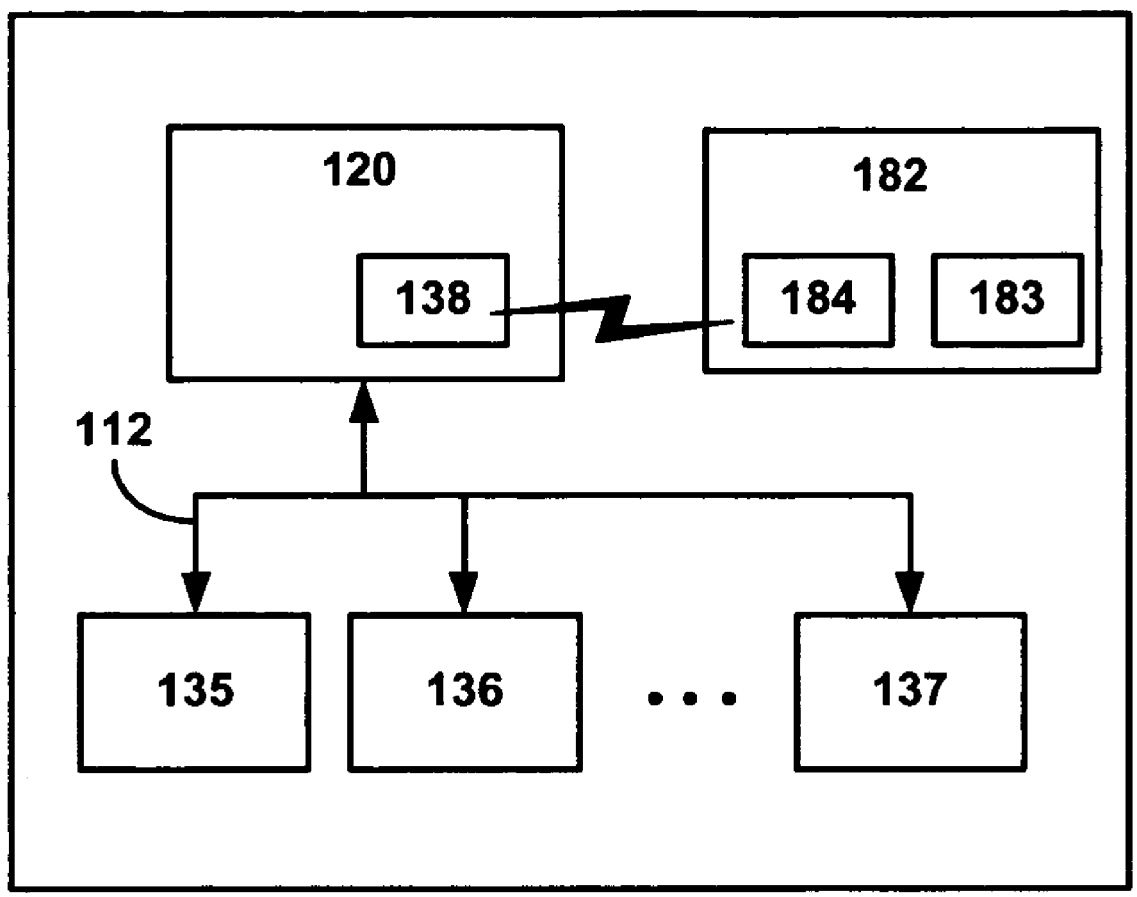
FIG. 2 is a schematic diagram of a first embodiment of a transmission path for the diagnostic information within a vehicle in accordance with one aspect of the invention.

FIG. 2 is a schematic diagram 200 of a first embodiment of a transmission path for the diagnostic information in the MVCU 110 in accordance with one aspect of the invention. The transmission paths are shown between a plurality of electronic modules 135, 136 and 137, the telematics unit 120, and the portable communication device 182 all within the MVCU 110. The telematics unit 120 includes a short-range wireless device 138. The portable communication device 182 includes a memory 183 and a short-range wireless chip 184. Portable communication devices 182 with a memory 183 may have a secure data (SD) or compact flash (CF) memory interface through which data is transmitted to a removable memory card (not shown). The portable communication device 182 is, at least temporarily, located within the short-range wireless distance, typically less than 10 meters, from the telematics unit 120.

The plurality of electronic modules 135, 136 and 137 transmit diagnostic information to the telematics unit 120 via the vehicle communication network 112. The diagnostic information from the electronic modules 135, 136 and 137 can include many diagnostics packet identification numbers (DPIDs), which are predefined parameters that translate to specific memory locations in the electronic modules 135, 136 and 137. The diagnostic information can also include data collected by various sensors in the electronic modules 135, 136 and 137. For example, a DPID may contain a representation of battery voltage, battery temperature and the like.

A short-range wireless connection is established between the short-range wireless device 138 and the short-range wireless chip 184. The telematics unit 120 transmits the diagnostic information to the portable communication device 182 via this short-range wireless connection. The short-range wireless device 138 initiates the short-range wireless connection with the short-range wireless chip 184 in the portable communication device 182 upon receipt of data from electronic modules 135, 136 and 137.

The short-range wireless devices 138 and 184 can be Bluetooth chips, Wi-Fi chips, FCC part 15 devices or radio chips. The short-range wireless devices 138 and 184 must be for compatible technologies.

Bluetooth is a worldwide digital radio standard developed to allow devices to communicate wirelessly over short distances of less than 10 meters. A Bluetooth chip provides spectrum spreading by frequency hopping in seventy-nine (79) hops of 1 MHz, starting at 2.402 GHz and finishing at 2.480 GHz. The Bluetooth chip uses Gaussian Frequency Shift Keying (GFSK) where a binary one is represented by a positive frequency and a binary zero is represented by a negative frequency deviation.

Wi-Fi chips operate in the unlicensed 2.4 and 5 GHz radio bands at data rates of 11 Mbps or 54 Mbps, according to the IEEE specifications 802.11a, 802.11b and 802.11g, respectively, or with both bands (dual band). A portable communication device 182 such as a laptop computer or a personal digital assistant (PDA) can establish a Wi-Fi connection with the telematics unit 120 through a built-in, or embedded, Wi-Fi radio or through a standard slide-in PC card radio.

A radio chip can be a radio access device to interface with the modules at or before a radio network controller, which performs tasks in a 3 G wireless network analogous to those of a base station controller in a 2 G or 2.5 G network. The radio network controller interfaces with service nodes and gateways to mediate with the network service providers.

As described below in reference to method 400 in FIG. 4, the portable communication device 182 stores the diagnostic information in a memory 183 to form a recent-history vehicle database. As described below in reference to method 400 in FIG. 4 and to method 500 in FIG. 5, the portable communication device 182 also performs diagnostic analysis based on the on the recent-history vehicle database.

In one embodiment, the telematics unit 120 is configured to periodically request diagnostic information from the electronic modules 135, 136 and 137. In another embodiment, portable communication device 182 is configured to prompt the telematics unit 120 for diagnostic information, so the telematics unit 120, in turn, requests diagnostic information from the electronic modules 135, 136 and 137.

Figure 3:
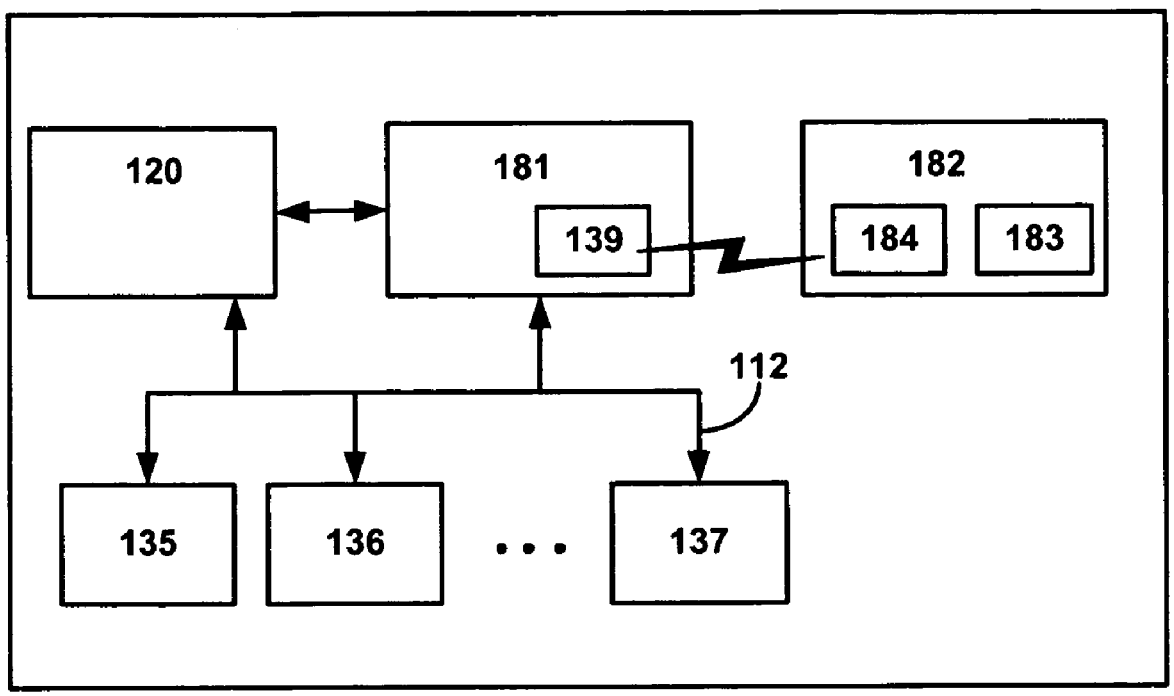
FIG. 3 is a schematic diagram of a second embodiment of a transmission path for the diagnostic information within a vehicle in accordance with one aspect of the invention.

FIG. 3 is a schematic diagram of a second embodiment 300 of a transmission path for the diagnostic information in the MVCU 110 in accordance with one aspect of the invention. The transmission paths are shown between a plurality of electronic modules 135, 136 and 137, a vehicle interface system 181, the telematics unit 120 and the portable communication device 182 all within the MVCU 110. The vehicle interface system 181 includes one or more short-range wireless chips 139. The portable communication device 182 includes a memory 183 and a short-range wireless chip 184. The portable communication device 182 is, at least temporarily, located within the short-range wireless distance, typically less than 10 meters, from the vehicle interface system 181. In this embodiment, the telematics unit 120 does not have a short-range wireless device 138. The electronic modules 135, 136 and 137 are connected to the telematics unit 120 and vehicle interface system 181 via the vehicle communication network 112.

If the plurality of electronic modules 135, 136 and 137 transmit diagnostic information to the vehicle interface system 181 via the vehicle communication network 112, then the vehicle interface system 181 transmits the diagnostic information to the portable communication device 182 via the short-range wireless connection. The short-range wireless chip 139 establishes the short-range wireless connection with the short-range wireless chip 184 in the portable communication device 182 upon receipt of data from electronic modules 135, 136 and 137. In one embodiment, electronic modules 135, 136 and 137 transmit diagnostic information to the telematics unit 120 via the vehicle communication network 112 and the diagnostic information is then transmitted to the vehicle interface system 181 via a hard wire connection.

Figure 4:
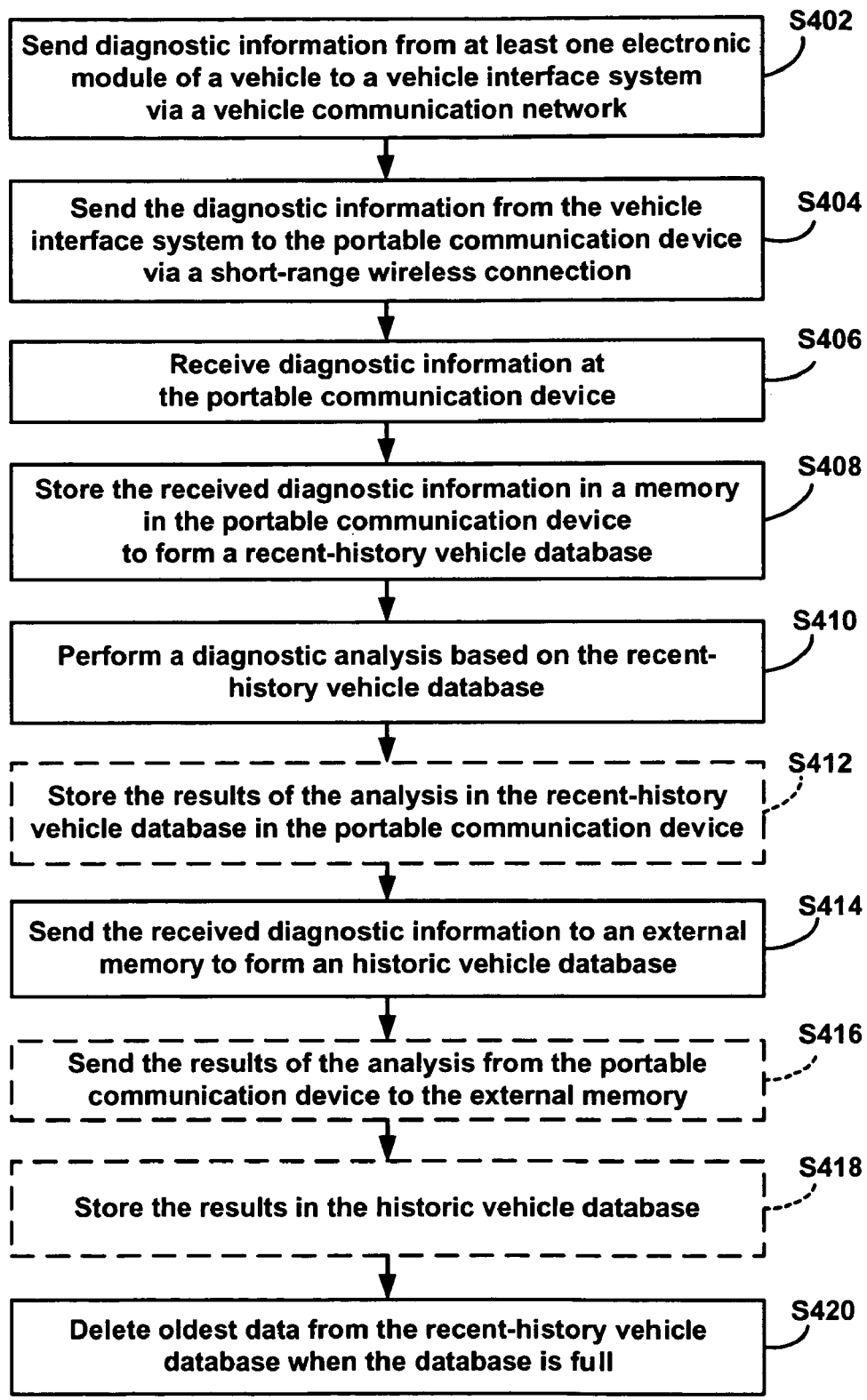
FIG. 4 illustrates a flowchart representative of a first embodiment of a method of performing vehicle diagnostic in accordance with the present invention.

FIG. 4 illustrates a flowchart representative of a first embodiment of a method 400 of performing vehicle diagnostics in accordance with the present invention with reference to the embodiment illustrated in FIG. 3. The portable communication device 182, the telematics unit 120 and the one or more electronic modules 135, 136 and 137 have stored in computer readable medium at least one computer program, which includes computer readable code to perform the operations described with reference to method 400.

During stage S402, one or more electronic modules 135, 136 and 137 send the diagnostic information to a vehicle interface system 181 via a vehicle communication network 112. In one embodiment, as illustrated in FIG. 2, one or more electronic modules 135, 136 and 137 send the diagnostic information to the telematics unit 120 via a vehicle communication network 112.

During stage S404, the vehicle interface system 181 sends the diagnostic information to the portable communication device 182 via a short-range wireless connection. The short-range wireless connection is established between the short-range wireless chip 139 and the short-range wireless chip 184. As described above with reference to FIG. 2, the short-range wireless connection can be a Wi-Fi, Bluetooth or radio connection. In the embodiment illustrated in FIG. 2, the telematics unit 120 sends diagnostic information to the portable communication device 182 via a short-range wireless connection established between the short-range wireless device 138 in the telematics unit 120 and the short-range wireless chip 184.

During stage S406, a portable communication device 182 receives the diagnostic information from at least one electronic module 135, 136 and 137 within the MVCU 110 from the vehicle interface system 181. In the embodiment illustrated in FIG. 2, the portable communication device 182 receives the diagnostic information from the telematics unit 120.

During stage S408, the received diagnostic information is stored in memory 183 in the portable communication device 182 to form a recent-history vehicle database. The diagnostic information may be stored in different regions of memory 183. The recent-history vehicle database includes the currently received and previously received diagnostic information up to a preset limit. In one embodiment, the recent-history vehicle database may be limited to a maximum allocated amount of the memory, such as, 10 Gigabite of RAM. In this embodiment, the portable communication device 182 deletes at least a portion of the oldest data from the recent-history vehicle database, if received diagnostic information causes the recent-history vehicle database to exceed the maximum allocated memory.

In another embodiment, the recent-history vehicle database may be limited to diagnostic information received within a set period of time, such as, the last 3 months or the last month. In this embodiment, the portable communication device 182 deletes data from the recent-history vehicle database, which has been stored for a period of time equal to or exceeding the set period of time.

During stage S410, the portable communication device 182 performs a diagnostic analysis based on the recent-history vehicle database stored within memory 183. In one embodiment, the portable communication device 182 performs a diagnostic analysis whenever new diagnostic information is received. In another embodiment, the portable communication device 182 periodically performs a diagnostic analysis. In this latter embodiment, the portable communication device 182 includes a processor (not shown), which periodically prompts the portable communication device 182 to perform a diagnostic analysis on the data in the recent-history vehicle database. In this case, the portable communication device 182 can perform the diagnostic analysis without being in the MVCU 110. Details about the diagnostic analysis are described below with reference to method 500 in FIG. 5.

During stage S412, the portable communication device 182, optionally, stores the results of the analysis performed during stage S410 in the recent-history vehicle database in memory 183.

During stage S414, the portable communication device 182 sends the diagnostic information received during stage S406 to an external memory to form an historic vehicle database. The historic vehicle database includes all the diagnostic information received at the telematics unit 120 or the vehicle interface system 181. The historic vehicle database can be updated periodically from the recent-history vehicle database in memory 183 or the historic vehicle database can be updated each time diagnostic information is received at the telematics unit 120 or the vehicle interface system 181.

The historic vehicle database provides the user with an extensive history of the MVCU 110 that can be provided to a vehicle service provider. The vehicle service provider may want to review the historic vehicle database every time the MVCU 110 is serviced, or alternatively, only if the MVCU 110 has a problem which is difficult to fix. In one embodiment, if the vehicle service provider wants to review the historic vehicle database, the data center 185 transmits the data to the vehicle service provider via one or more web-hosting portals 160 in the Internet. In another embodiment, the data center 185 transmits the data to the vehicle service provider via one or more wireless carrier systems 140, one or more communication networks 142, one or more land networks 144.

The external memory includes a memory of a personal computer, one or more databases in a call center, one or more databases in a data center, a removable memory card, and combinations thereof. If the external memory is a memory (not shown) in a personal computer 150 of the user, the diagnostic information is retrieved from memory 183 in the portable communication device 182 and copied to a removable memory card (not shown) that is attached to the portable communication device 182. The diagnostic information is then downloaded from the removable memory card into the historic vehicle database for the MVCU 110 stored within the personal computer 150.

Alternatively, if the personal computer is configured with a Wi-Fi or Bluetooth chip, the portable communication device 182 is positioned within the short-range wireless distance from the personal computer 150 and the diagnostic information is downloaded as packet data via a short-range wireless connection into the historic vehicle database for the MVCU 110 stored within the personal computer 150.

In one embodiment, the external memory is the data center 185. In that case, the diagnostic information, which was input to a memory in the personal computer 150, as described above, is transferred as packet via one or more Internet web-hosting portals 160 for storage in the historic vehicle database for the MVCU 110 in the data center 185. In another embodiment, the diagnostic information, which was input to a memory in the personal computer 150, as described above, is transferred as packet data via one or more wireless carrier systems 140, one or more communication networks 142, one or more land networks 144.

Alternatively, if the external memory is the data center 185, the portable communication device 182 sends the received diagnostic information as packet data to a call center 170 via one or more wireless carrier systems 140, one or more communication networks 142, one or more land networks 144. Then the call center 170 sends the diagnostic information to an associated data center 185 via one or more wireless carrier systems 140, one or more communication networks 142, one or more land networks 144 for storage in the historic vehicle database for the MVCU 110.

During stage S416, the portable communication device 182, optionally, sends the results of the diagnostic analysis performed during stage S410 to an external memory such as the data center 185, or a personal computer 150 of the user. The methods of transmitting the data packets for the diagnostic analysis include all the methods described in reference to stage S414.

During stage S418, if the results of the diagnostic analysis were sent during stage S416, they are stored in the historic vehicle database along with the stored diagnostic information, as part of the historic vehicle database.

During stage S420, the portable communication device 182 deletes at least a portion of the oldest data from the recent-history vehicle database when the database is full, as described above during stage S408. Before any data is deleted from the recent-history vehicle database stored in memory 183 of the portable communication device 182, the data to be deleted is sent to the external memory for storage in the historic vehicle database as described in reference to stages S414 and S416. This ensures that the historic vehicle database is complete with all the received diagnostic information for MVCU 110.

Figure 5:
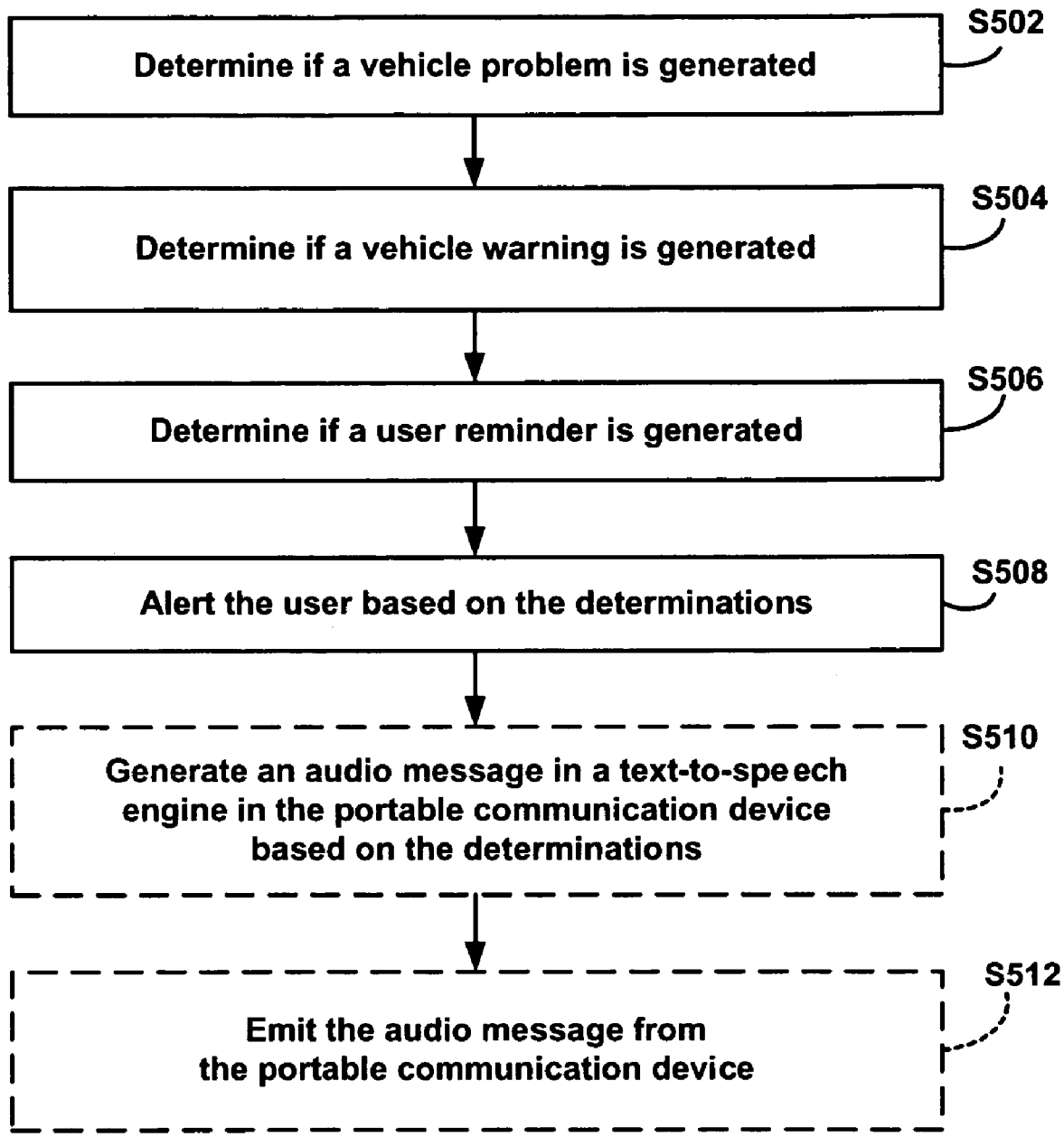
FIG. 5 illustrates a flowchart representative of a first embodiment of a method of performing a diagnostic analysis in accordance with the present invention.

FIG. 5 illustrates a flowchart representative of a first embodiment of a method 500 of performing a diagnostic analysis in accordance with the present invention. The portable communication device 182 has stored in computer readable medium at least one computer program, which includes computer readable code to perform the operations described with reference to method 400. As described with reference to stage S410, the portable communication device 182 performs a diagnostic analysis based on the recent-history vehicle database stored within memory 183. During a diagnostic analysis, the portable communication device 182 applies algorithms that are stored in memory 183 to the data stored in the recent-history vehicle database.

During stage S502, the portable communication device 182 determines if a vehicle problem is generated by the diagnostic analysis. A vehicle problem indicates that immediate action is required by the user of the MVCU 110 to resolve the problem. Vehicle problems include, for example, loss of all engine oil, high probability for brake failure in the near future, and impending loss of control in the steering column. The vehicle problem can also indicate an existing problem that is not critical to the safe operation of the MVCU 110. Such non-critical problems can include, for example, loss of power needed to operate a passenger window or a fan stuck at one level of operation.

During stage S504, the portable communication device 182 determines if a vehicle warning is generated by the diagnostic analysis. A vehicle warning indicates that action is required by the user of the MVCU 110 to prevent a future problem. Vehicle warnings include, for example, a low level of engine oil, worn brake discs, and a higher than normal loss of a fluid required for normal operation of the MVCU 110.

During stage S506, the portable communication device 182 determines if a vehicle reminder is generated by the diagnostic analysis. A vehicle reminder indicates that a periodic vehicle service date is past or approaching within a preset time, such as one week. Periodic vehicle services include time and/or mileage based oil changes, mileage based tire rotations, and mileage based vehicle maintenance services, such as the 25,000-mile vehicle service. In one embodiment, periodic vehicle services are based on sensor values.

During stage S508, the portable communication device 182 alerts the user of the MVCU 110 based on the determinations. If a vehicle problem, vehicle warning and/or user reminder are generated, an alert is provided by the portable communication device 182. The alert is a text message on a display (not shown) in the portable communication device 182, which notifies the user of the problem, warning or reminder. In one embodiment, if a vehicle problem, vehicle warning and user reminder are not generated, a message is provided to the user that the diagnostic analysis did not generate any alerts.

During stage S510, the portable communication device 182, optionally, generates an audio message in a text-to-speech engine within the portable communication device 182 based on the determinations, if the portable communication device 182 includes a text-to-speech engine. During stage S512, the portable communication device 182 emits the audio message if an audio message was generated during stage S510.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of performing vehicle diagnostics, comprising:

sending diagnostic information from an electronic module of a vehicle to a vehicle communication device located in the vehicle, wherein the sending step further comprises sending the diagnostic information over a vehicle communication network that interconnects the vehicle communication device with a plurality of other electronic modules;

sending the diagnostic information from the vehicle communication device to a portable communication device, wherein a short-range wireless chip in the vehicle communication device communicates the information from the vehicle communication device to the portable communication device via a short-range wireless connection;

storing the received diagnostic information in a memory in the portable communication device to form a recent-history vehicle database, wherein the storing step further comprises storing the received diagnostic information alone with previously-received diagnostic information such that the recent-history vehicle database includes both the received diagnostic information and the previously-received diagnostic information;

performing a diagnostic analysis based on the recent-history vehicle database; and sending the received diagnostic information from the portable communication device to an external memory to form an historic vehicle database.

2. The method of claim 1, further comprising:

storing the results of the analysis in the recent-history vehicle database in the portable communication device;

sending the results of the analysis from the portable communication device to the external memory; and storing the results in the historic vehicle database.

3. The method of claim 1, wherein the receiving is responsive to a periodic request for diagnostic information from the telematics unit.

4. The method of claim 1, wherein the receiving is responsive to a periodic request for diagnostic information from the portable communication device.

5. The method of claim 1, wherein the vehicle communication device comprises a telematics unit or a vehicle interface system.

6. The method of claim 1, wherein the performing a diagnostic analysis includes:

determining if a vehicle problem is generated;

determining if a vehicle warning is generated;

determining if a user reminder is generated; and alerting the user based on the determinations.

7. The method of claim 6, wherein the alerting is a visual display on the portable communication device.

8. The method of claim 6, wherein the alerting comprises: generating an audio message in a text-to-speech engine in the portable communication device based on the determinations; and emitting the audio message from the portable communication device.

9. The method of claim 1, wherein the external memory is selected from the group consisting of a memory of a personal computer, one or more databases in a call center, one or more databases in a data center, a removable memory card, and combinations thereof.

10. The method of claim 1, further comprising: deleting oldest data from the recent-history vehicle database when the database is full.

11. The method of claim 1, further comprising: providing at least a portion of the historic vehicle database from a data center to a vehicle service center upon request by a user.

12. A system for performing vehicle diagnostics, the system comprising:

means for sending diagnostic information from an electronic module of a vehicle to a vehicle communication device located in the vehicle, wherein the electronic module receives the diagnostic information over a vehicle communication network that interconnects the vehicle communication device with a plurality of other electronic modules;

means for sending the diagnostic information from the vehicle communication device to a portable communication device, wherein a short-range wireless chip in the vehicle communication device communicates the information from the vehicle communication device to the portable communication device via a short-range wireless connection;

means for storing the received diagnostic information in a memory in the portable communication device to form a recent-history vehicle database;

means for performing a diagnostic analysis based on the recent-history vehicle database; and means for sending the received diagnostic information from the portable communication device to an external memory to form an historic vehicle database.

13. The system of claim 12 further comprising;

means for storing the results of the analysis in the recent-history vehicle database in the portable communication device;

means for sending the results of the analysis from the portable communication device to the external memory; and means for storing the results in the historic vehicle database.

14. The system of claim 12, wherein the vehicle communication device comprises a telematics unit or a vehicle interface system.

15. The system of claim 12, wherein the performing a diagnostic analysis includes:

means for determining if a vehicle problem is generated;

means for determining if a vehicle warning is generated;

means for determining if a user reminder is generated; and means for alerting the user based on the determinations.

16. The system of claim 15, wherein the alerting comprises:

means for generating an audio message in a text-to-speech engine in the portable communication device based on the determinations; and means for emitting the audio message from the portable communication device.

17. The system of claim 12, further comprising: means for deleting the oldest data from the recent-history vehicle database when the database is full.

18. A computer readable medium storing a computer program comprising:

computer readable code for diagnostic information from an electronic module of a vehicle to a vehicle communication device located in the vehicle, wherein the electronic module receives the diagnostic information over a vehicle communication network that interconnects the vehicle communication device with a plurality of other electronic modules;

computer readable code for sending the diagnostic information from the vehicle communication device to a portable communication device, wherein a short-range wireless chip in the vehicle communication device communicates the information from the vehicle communication device to the portable communication device via a short-range wireless connection;

computer readable code for storing the received diagnostic information in a memory in the portable communication device to form a recent-history vehicle database, wherein the computer readable code for storing the received diagnostic information includes computer readable code for storing the received diagnostic information alone with previously-received diagnostic information such that the recent-history vehicle database includes both the received diagnostic information and the previously-received diagnostic information;

computer readable code for performing a diagnostic analysis based on the recent-history vehicle database; and computer readable code for sending the received diagnostic information from the portable communication device to an external memory to form an historic vehicle database.

19. The medium of claim 18 further comprising:

computer readable code for storing the results of the analysis in the recent-history vehicle database in the portable communication device;

computer readable code for sending the results of the analysis from the portable communication device to the external memory; and computer readable code for storing the results in the historic vehicle database.

20. The medium of claim 18, wherein the vehicle communication device comprises a telematics unit or a vehicle interface system.

21. The medium of claim 18, wherein the computer readable code for performing a diagnostic analysis includes:

computer readable code for determining if a vehicle problem is generated;

computer readable code for determining if a vehicle warning is generated;

computer readable code for determining if a user reminder is generated; and computer readable code for alerting the user based on the determinations.

* * * * *